UNITED STATES PATENT OFFICE.

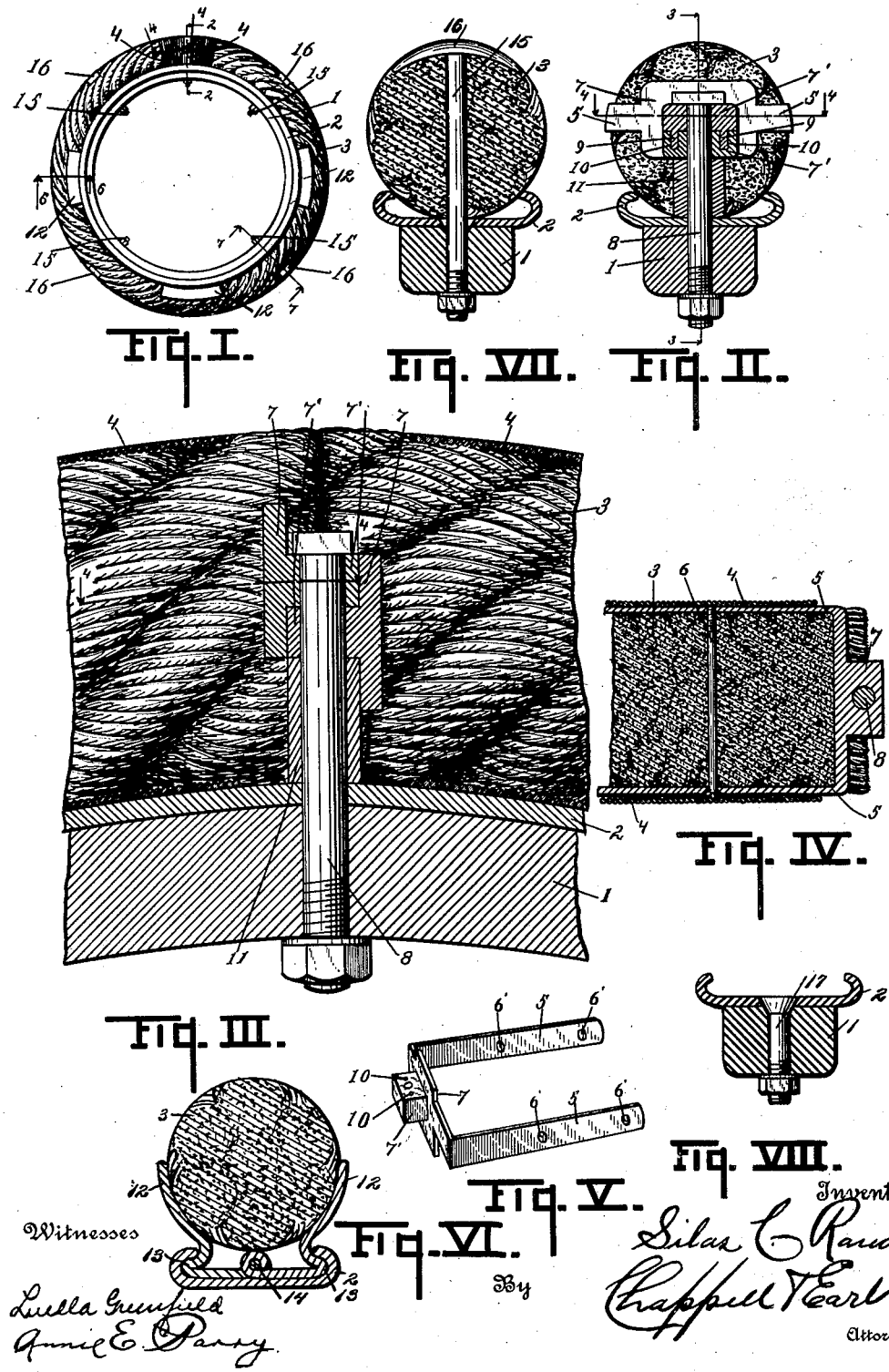

SILAS C. RAND, OF BATTLE CREEK, MICHIGAN.

EMERGENCY-TIRE FOR AUTOMOBILES OR SIMILAR USE.

1,095,287. Specification of Letters Patent. Patented May 5, 1914.

Application filed August 28, 1913. Serial No. 787,083.

*To all whom it may concern:*

Be it known that I, SILAS C. RAND, a subject of the King of Great Britain, residing at Battle Creek, in the county of Calhoun, State of Michigan, have invented certain new and useful Improvements in Emergency-Tires for Automobiles or Similar Use, of which the following is a specification.

This invention relates to an improved emergency tire for automobiles or similar use.

The objects of the invention are: First, to provide a very inexpensive and effective tire sufficiently durable for emergency use. Second, to provide improved fastening means for coupling such a tire to the rim of an automobile wheel. Third, to provide an improved seat device that will coöperate with the usual clencher rim. Fourth, to provide an improved clamp that will retain such a tire in a clencher rim and will coöperate with such improved seat devices.

Further objects and objects relating to details and economies of construction and operation will definitely appear from the detailed description to follow.

I accomplish the objects of my invention by the devices and means described in the following specification.

The invention is clearly defined and pointed out in the claims.

A structure which is an embodiment of my invention is clearly illustrated in all of its details in the accompanying drawing forming a part of this specification, in which:

Figure I is an elevation view of an automobile wheel felly, and rim with my improved tire in position. Fig. II is an enlarged detail transverse sectional view taken on a line corresponding to line 2—2 of Fig. I, showing the details and coupling for improved tire. Fig. III is an enlarged detail longitudinal sectional view taken on a line corresponding to line 3—3 of Fig. II, showing further details of the said coupling means. Fig. IV is an enlarged detail longitudinal sectional view taken on a line corresponding to line 4—4 of Figs. II and III, showing details of the coupling means. Fig. V is an enlarged detail perspective view of one of the end coupling yokes 7, the opposite yoke being symmetrical and corresponding thereto. Fig. VI is an enlarged detail transverse sectional view on line 6—6 of Fig. I, showing the seat device for my improved emergency tire. Fig. VII is an enlarged detail sectional view on line 7—7 of Fig. I, showing the details of my improved clamp device. Fig. VIII is an enlarged detail sectional view on a line corresponding to line 7—7 of Fig. I, showing the short bolt plug within the rim when the emergency tire and its clamp are not in use.

In the drawing all of the sectional views are taken looking in the direction of the little arrows at the ends of the section lines, and similar numerals of reference refer to similar parts throughout the several views.

Considering the numbered parts of the drawing, the wheel felly 1 is covered with a usual clencher rim 2, in which is disposed my emergency tire 3 which is made of a large rope corresponding to the dimension of the tire replaced. The ends of the rope are wound with suitable strands of cord or wire 4 and within these are secured the projecting arms 5, 5, of the coupling yoke 7, which arms are perforated at 6', 6', to receive the transverse bolt 6 therethrough. Each yoke 7 is provided with a projecting lug 7', these being opposite and symmetrical, the one being provided with holes 10 and the other with dowel pins 9 for coupling the same, and both of the same being perforated transversely and radially to receive the attaching bolt 8, which is inserted through the hole for the valve tube. See particularly Figs. II, III and IV. This rope tire is intended purely as an emergency tire and where the accident to the tire which it replaces is at a short distance from a garage or other relief station, this end fastening will be quite sufficient. However, if it is necessary for the car to have a considerable run I provide for insertion for supporting the same, the pivoted clencher support wings 12, 12, which are pivoted together centrally at 14 and have laterally projecting flange portions 13, 13, formed by bends in the metal which engage the clencher rim 2, as clearly appears in the detailed Fig. VI. These wings are disposed at intervals around the rim 4, being disposed one at each quarter as illustrated, which is found to be quite effective. For very great security the tire should be clamped between these supports by the bolts 15, each having a T hook 16 which is disposed through suitable holes in the rim 2 and felly 1. This necessitates that when the emergency tire has been removed the large hole in the clencher rim under the same be plugged, and this is done by providing a taper headed plug bolt 17, (see particularly Fig. VIII), which is inserted when the clamp bolt 15 is removed.

From this description it will be seen that my invention is capable of considerable modification.

The complete structure comprises the rope with the couplings at the ends, the wing supports, and the clamps, which provide a very effective tire device. However, when the need for the tire is but for a short run it is only necessary to couple the ends of the rope together and let the same rest within the flanges of the clencher rim. The other devices are provided as extra security and provide a tire which will stand for a long run very effectively.

I desire to claim the detail features, as well as the broad invention, as pointed out in the appended claims.

Having thus described my invention, what I claim as new and desire to secure by Letters Patent is:

1. The combination with a felly and clencher rim, of a rope tire of sufficient dimension to fill the same, provided with coupling means, pivoted wing supports with projecting flanges to engage the flanges of the clencher rim disposed at intervals around the wheel and embracing the said rope, and a T-shaped clamp bolt through the rope and through the felly and rim alternating with said wing supports to retain the tire in position, all coacting substantially as described for the purpose specified.

2. The combination with a felly and clencher rim, of a rope tire of sufficient dimension to fill the same, provided with coupling means, and pivoted wing supports with projecting flanges to engage the flanges of the clencher rim disposed at intervals around the wheel and embracing the said rope, coacting substantially as described for the purpose specified.

3. The combination with a felly and clencher rim, of a rope tire of sufficient dimension to fill the same, provided with coupling means, wing supports with projecting flanges to engage the flanges of the clencher rim disposed at intervals around the wheel and embracing said rope, and a T-shaped clamp bolt through the rope and through the felly and rim alternating with said wing supports to retain the tire in position, coacting substantially as described for the purpose specified.

4. The combination with a felly and clencher rim, of a rope tire of sufficient dimension to fill the same, provided with coupling means, and wing supports with projecting flanges to engage the flanges of the clencher rim disposed at intervals around the wheel and embracing the said rope, all coacting substantially as described for the purpose specified.

In witness whereof, I have hereunto set my hand and seal in the presence of two witnesses.

SILAS C. RAND. [L. S.]

Witnesses:
LUELLA G. GREENFIELD,
GRACE B. THOMPSON.